: US006191824B1

United States Patent
Ogawa

(10) Patent No.: US 6,191,824 B1
(45) Date of Patent: Feb. 20, 2001

(54) VIDEO SIGNAL PROCESSING APPARATUS

(75) Inventor: Yoshihiko Ogawa, Yokohama (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/175,365

(22) Filed: Oct. 20, 1998

(30) Foreign Application Priority Data

Oct. 20, 1997 (JP) .................................................. 9-287039

(51) Int. Cl.[7] .............................. H04N 3/27; H04N 5/46
(52) U.S. Cl. ......................... 348/555; 348/556; 348/706
(58) Field of Search .................................. 348/553, 554, 348/555, 556, 557, 558, 705, 706, 443, 444, 445, 446, 448; H04N 3/27, 5/46

(56) References Cited

U.S. PATENT DOCUMENTS

| 5,361,099 | * | 11/1994 | Kim | 348/555 |
| 5,461,427 | * | 10/1995 | Duffield et al. | 348/555 |
| 5,475,442 | * | 12/1995 | Matsushita et al. | 348/554 |
| 5,898,463 | * | 4/1999 | Nishiyama | 348/554 |
| 6,067,123 | * | 5/2000 | Lee | 348/555 |

OTHER PUBLICATIONS

"Transfer Method of Video ID Information Using Vertical Blanking Interval," Technical Report of Electronic Industries Association of Japan, EIAJ CPR–1204, Mar. 1997.

* cited by examiner

Primary Examiner—Michael Lee
(74) Attorney, Agent, or Firm—Pillsbury Madison & Sutro LLP

(57) ABSTRACT

When both a progressive scanning video signal (for example, telecine signal) and an interlace scanning signal are present, the telecine signal is processed with pulldown information. The interlace scanning signal is processed without the pulldown information. Thus, even if both a telecine signal and a conventional interlace scanning signal are present, the pulldown information can be effectively used.

7 Claims, 8 Drawing Sheets

VIDEO SIGNAL PROCESSING APPARATUS

BACKGROUND OF THE INVENTION

1. Field of the Invention

The present invention relates to a video signal processing apparatus that processes both a progressive scanning video signal and a conventional interlace scanning video signal.

2. Description of the Related Art

Generally, when a 24 fps (frames per second) movie, for example, is converted into a video signal so-called telecine signal, two or three fields of the video signal are composed of one frame of the movie. This format is referred to as 3-2 pulldown format. When such a video signal is displayed on a progressive scanning TV receiver, with information that represents which field is generated with which frame, scan lines can be properly interpolated. Thus, the picture quality of the video signal is improved. FIG. 9(a) shows a scan line interpolating process in the case of a 24 fps film. FIG. 9(b) shown a scan line interpolating process in the case of a 30 fps film.

With signals of two fields generated with the same frame, an inter-field interpolating process is performed. To do that, it is necessary to know which field is generated with which frame. When the current field is generated with the same frame as the preceding field, "same frame" information is transmitted as pulldown information. In contrast, when the current field is generated with the different frame as the preceding field, "different frame" information is transmitted as pulldown information.

A pulldown transmitting method has been defined in "Video ID signal transmitting method", Engineering Report EIAJ CPR-1204, Electronic Industries Association of Japan, May 1997. According to the method, the pulldown information is transmitted as "same frame" information when the current field is generated with the same frame as the preceding field. In contrast, the puildown information is transmitted as "different frame" information when the current field is generated with the different frame as the preceding field. With the pulldown information, a telecine video signal can be converted into a progressive scanning signal with high quality.

However, according to the CPR-1204 standard, it is not necessary to transmit pulldown information in each field. In addition, another information can be transmitted along with the pulldown information. In this case, such an area should be sequentially processed.

Thus, when a telecine signal is continuous, no problem takes place. However, when there are both a telecine signal and a conventional interlace scanning signal, the pulldown information cannot be effectively used.

SUMMARY OF THE INVENTION

An object of the present invention is to provide a video signal processing apparatus that effectively performs a progressive scanning process even if both a progressive scanning video signal and a conventional interlace scanning video signal are present.

A first aspect of the present invention is a video signal processing apparatus, comprising a means for determining whether an input signal is a progressive scanning first video signal or an interlace scanning second video signal and generating a determination signal corresponding to the determined result, a first converting means for converting the first video signal into an interlace scanning third video signal when the first video signal has been input, a means for selecting the second video signal and outputting a fourth video signal when the determination signal represents that the second video signal has been input and for selecting the third video signal and outputting a fourth video signal when the determination signal represents that the first video signal has been input, a second converting means for converting the fourth video signal into a progressive scanning signal corresponding to motion information of the fourth video signal when the fourth video signal is the second video signal, a third converting means for converting the fourth video signal into a progressive scanning signal corresponding to the first converting means when the fourth video signal is the third video signal, and a means for selecting an output signal of the second converting means and outputting a fifth video signal when the determination signal represents that the second video signal has been input and for selecting an output signal of the third converting means and outputting a fifth video signal when the determination signal represents that the first video signal has been input.

A second aspect of the present invention is a video signal processing apparatus, comprising a means for determining whether an input signal is a progressive scanning first video signal or an interlace scanning second video signal and generating a determination signal corresponding to the determined result, a first converting means for converting the first video signal into an interlace scanning third video signal when the first video signal has been input, a means for generating a field determination signal that represents that the next field of the third video signal are generated with the same frame as the first video signal, a means for selecting the second video signal and outputting a fourth video signal when the determination signal represents that the second video signal has been input and for selecting the third video signal and outputting a fourth video signal when the determination signal represents that the first video signal has been input, a means for generating a control signal with the determination signal and the field determination signal, the control signal containing the information of both the determination signal and the field determination signal, a second converting means for converting the fourth video signal into a progressive scanning signal corresponding to motion information of the fourth video signal when the fourth video signal is the second video signal, a third converting means for converting the fourth video signal into a progressive scanning signal corresponding to the first converting means with the field determination signal contained in the control signal when the fourth video signal is the third video signal, and a means for selecting an output signal of the second converting means and outputting a fifth video signal when the determination signal contained in the control signal represents that the second video signal has been input and for selecting an output signal of the third converting means and outputting a fifth video signal when the determination signal contained in the control signal represents that the first video signal has been input.

A third aspect of the present invention is a video signal processing apparatus, comprising a means for determining whether an input signal is a progressive scanning first video signal or an interlace scanning second video signal and generating a determination signal corresponding to the determined result, a first converting means for converting the first video signal into an interlace scanning third video signal when the first video signal has been input, a means for generating a field determination signal that represents that the next field of the third video signal are generated with the same frame as the first video signal, a means for selecting the second video signal and outputting a fourth video signal when the determination signal represents that the second video signal has been input and for selecting the third video signal and outputting a fourth video signal when the determination signal represents that the first video signal has been input, a means for generating a control signal containing the information of both the determination signal and the field determination signal, and a means for processing the fourth video signal with the field determination signal contained in the control signal when the determination signal contained in the control signal represents that the first video signal has been input.

Thus, even if both a progressive scanning telecine signal and an interlace scanning video signal are present, for example, for the telecine signal, a process with the pulldown information is performed. For the interlace scanning video signal, a process without the pulldown information is performed. Thus, the puildown information can be effectively used.

These and other objects, features and advantages of the present invention will become more apparent in light of the following detailed description of a best mode embodiment thereof, as illustrated in the accompanying drawings.

DESCRIPTION OF PREFERRED EMBODIMENTS

Figure 1:
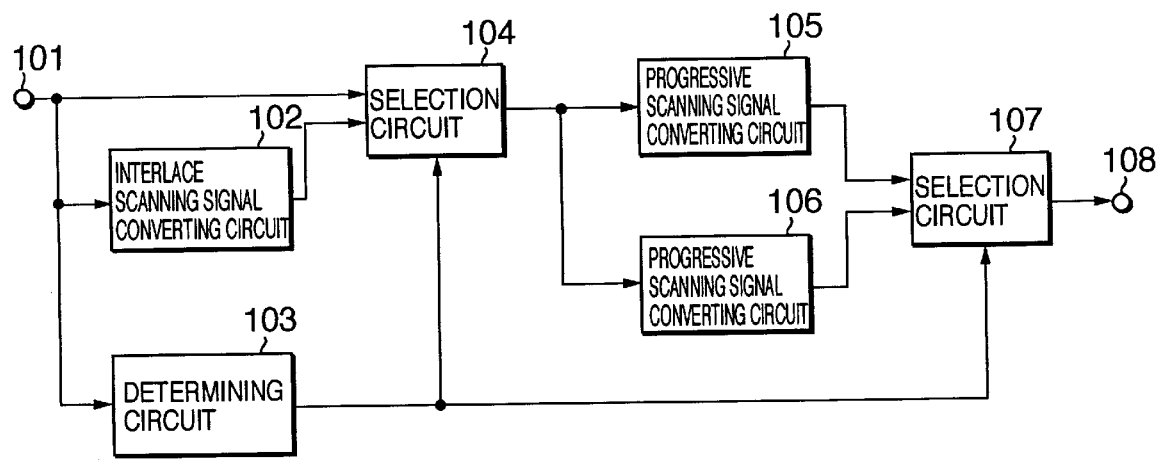
FIG. 1 is a block diagram showing the structure of a video signal processing apparatus according to a first embodiment of the present invention.

Next, with reference to the accompanying drawings, embodiments of the present invention will be described. FIG. 1 is a block diagram showing the structure of a video signal processing apparatus according to a first embodiment of the present invention. In FIG. 1, a 24 fps progressive scanning video signal or a conventional NTSC format interlace scanning video signal is input from an input terminal 101. The input video signal is supplied to one input terminal of a selection circuit 104, an interlace scanning signal converting circuit 102, and a determining circuit 103.

The determining circuit 103 determines whether the input video signal is a 24 fps progressive scanning video signal or a conventional NTSC format interlace scanning video signal and outputs a determination signal corresponding to the determined result. The interlace scanning signal converting circuit 102 converts a 24 fps progressive scanning video signal into a conventional NTSC format interlace scanning video signal with 3-2 pulldown format. An output signal of the interlace scanning signal converting circuit 102 is supplied to the other input terminal of the selection circuit 104. The selection circuit 104 selects one of input signals corresponding to the determination signal received from the determining circuit 103.

When the 24 fps progressive scanning video signal is input, the determining circuit 103 causes the selection circuit 104 to receive the input signal through the interlace scanning signal converting circuit 102. In contrast, when the conventional NTSC format interlace scanning video signal is input, the determining circuit 103 causes the selection circuit 104 to receive the input signal directly from the input terminal 101. An output signal of the selection circuit 104 is supplied to progressive scanning signal converting circuits 105 and 106.

The progressive scanning signal converting circuit 105 performs a motion adaptive progressive scanning signal converting process. In other words, the progressive scanning signal converting circuit 105 determines the motion of the input video signal. When the input video signal has a motion, the progressive scanning signal converting circuit 105 performs an intra-field process and outputs the resultant progressive scanning signal. When the input video signal does not have a motion, the progressive scanning signal converting circuit 105 performs an inter-field process and outputs the resultant progressive scanning signal. On the other hand, the progressive scanning signal converting circuit 106 performs an inter-field process corresponding to the 3-2 pulldown format. In other words, the progressive scanning signal converting circuit 106 performs an inter-field process with two fields generated with the same frame and outputs the resultant progressive scanning signal. An output signal of the progressive scanning signal converting circuit 105 is supplied to one input terminal of a selection circuit 107. An output signal of the progressive scanning signal converting circuit 106 is supplied to the other input terminal of the selection circuit 107.

The selection circuit 107 selects an input signal corresponding to the determination signal received from the determining circuit 103. When the determination signal received from the determining circuit 103 represents that the input signal received from the input terminal 101 is a 24 fps progressive scanning video signal, the selection circuit 107 selects the output signal of the progressive scanning signal converting circuit 106 and outputs the selected signal to an output terminal 108. In contrast, when the determination signal received from the determining circuit 103 represents that the input signal received from the input terminal 101 is a conventional NTSC format interlace scanning video signal, the selection circuit 107 selects the output signal of the progressive scanning signal converting circuit 105 and outputs the selected signal to the output terminal 108.

In other words, when the video signal that is output from the selection circuit 104 is a telecine signal converted with the 3-2 pulldown format, the progressive scanning signal converting circuit 106 performs an inter-field process corresponding to the process of the 3-2 pulldown format. In contrast, when the video signal that is output from the selection circuit 104 is a conventional video signal, the progressive scanning signal converting circuit 105 performs a motion adaptive progressive scanning signal converting process. An output signal of the selection circuit 107 is supplied as an output signal of the video signal processing apparatus to the output terminal 108.

According to the embodiment, even if both a signal converted into an interlace scanning signal with the 3-2 pulldown format and a conventional interlace scanning signal are present, for the interlace scanning signal with the 3-2 pulldown format, the progressive scanning signal converting process is performed corresponding to the process of the 3-2 pulldown format. For the conventional interlace scanning signal, the progressive scanning signal converting process is performed corresponding to the motion adaptive process. Thus, the relevant progressive scanning signal converting process can be performed corresponding to the type of the input signal.

Figure 2:
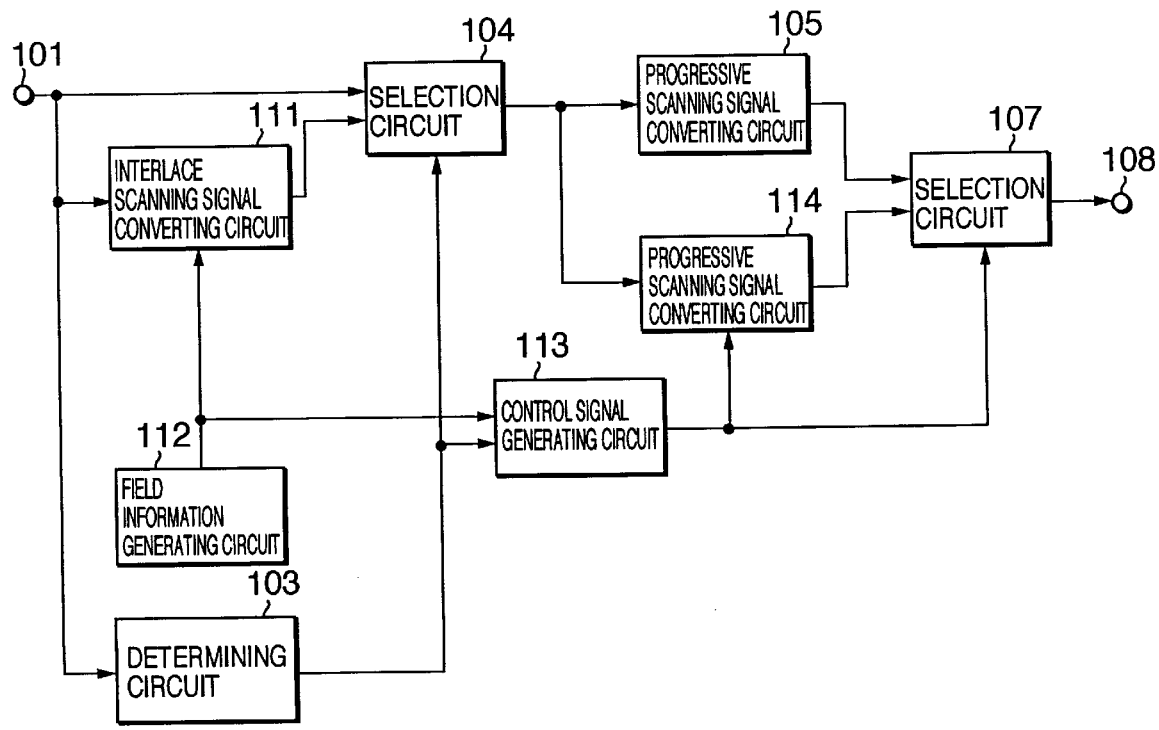
FIG. 2 is a block diagram showing the structure of a video signal processing apparatus according to a second embodiment of the present invention.

FIG. 2 is a block diagram showing the structure of a video signal converting apparatus according to a second embodiment of the present invention. For simplicity, in FIG. 2, similar portions to those in FIG. 1 are denoted by similar reference numerals.

A video signal that is input from an input terminal 101 is supplied to an input terminal 104*a* of a selection circuit 104, a determining circuit 103, and an interlace scanning signal converting circuit 111.

As with the interlace scanning signal converting circuit 102 shown in FIG. 1, the interlace scanning signal converting circuit 111 converts a 24 fps progressive scanning signal into a conventional NTSC format interlace scanning video signal with the 3-2 pulldown format. Then, field information that represents which field is generated with which frame is obtained from a field information generating circuit 112. In other words, by means of the field information received from the field information generating circuit 112, the interlace scanning signal converting circuit 111 controls a process for generating which field with which frame and converts a 24 fps progressive scanning video signal into a 60 Hz interlace scanning video signal. An output signal of the interlace scanning signal converting circuit 111 is supplied to an input terminal 104*b* of the selection circuit 104.

When the determining circuit 103 has determined that the input signal received from the input terminal 101 is a 24 fps progressive scanning video signal, the selection circuit 104 selects the input terminal 104*b* corresponding to the determination signal received from the determining circuit 103 and outputs the signal received from the interlace scanning signal converting circuit 111.

The determination signal received from the determining circuit 103 and field information received from the field information generating circuit 112 are supplied to a control signal generating circuit 113. The control signal generating circuit 113 generates a control signal containing the information of both the determination signal and the field information. The control signal that is output from the control signal generating circuit 113 is supplied to a progressive scanning signal converting circuit 114 and a selection circuit 107.

The progressive scanning signal converting circuit 114 performs a progressive scanning signal converting process with the field information contained in the control signal received from the control signal generating circuit 113. In other words, the progressive scanning signal converting circuit 114 performs an inter-field process with signals of two fields generated with the same frame.

The selection circuit 107 selects one of the two input signals with the information of the determination signal contained in the control signal received from the control signal generating circuit 113. When the information of the determination signal contained in the control signal received from the control signal generating circuit 113 represents that the input signal received from the input terminal 101 is a 24 fps progressive scanning video signal, the selection circuit 107 selects the output signal of the progressive scanning signal converting circuit 114 and outputs the selected signal to an output terminal 108. When the information of the determination signal contained in the control signal received from the control signal generating circuit 113 represents that the input signal received from the input terminal 101 is a conventional NTSC format interlace scanning video signal, the selection circuit 107 selects the output signal of the progressive scanning signal converting circuit 105 and outputs the selected signal to the output terminal 108.

Figure 7:
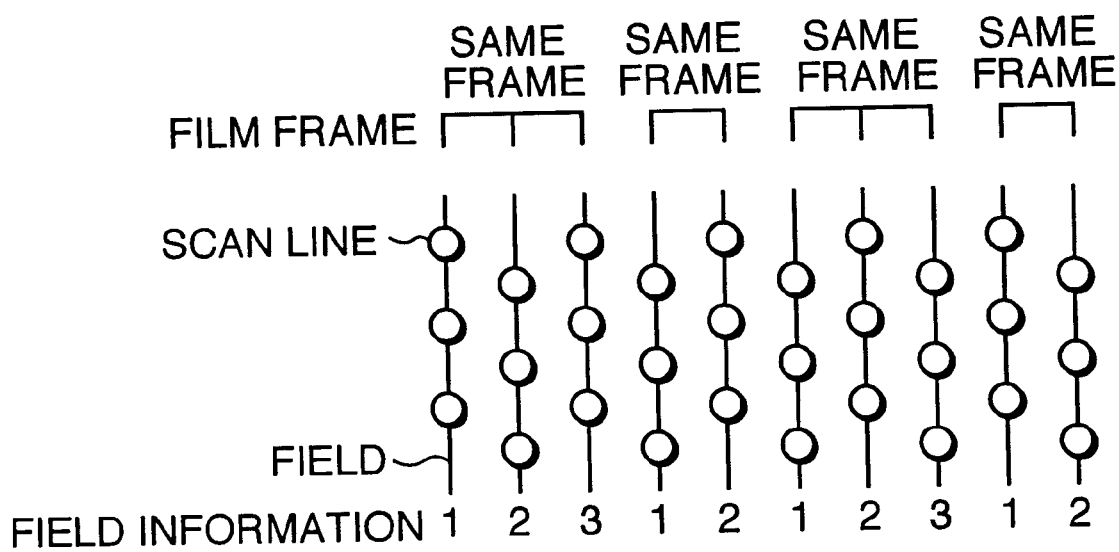
FIG. 7 is a schematic diagram for explaining field information in the operation of the video signal processing apparatus shown in FIG. 2.

The field information represents which field is generated with which frame as shown in FIG. 7. Fields generated with the same frame are successively numbered from 1. The same frame starts with number 1 and ends with number 3 or number 2.

Figure 8:
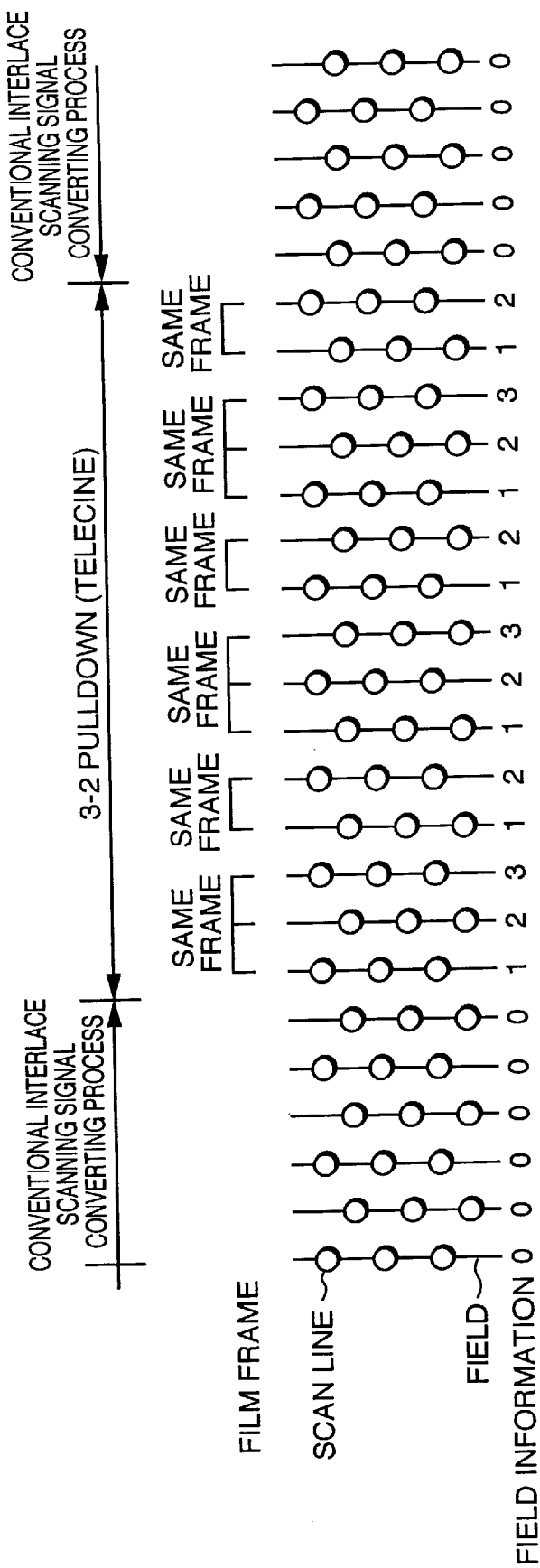
FIG. 8 is a schematic diagram for explaining a control signal in the operation of the video signal processing apparatus shown in FIG. 2.
Figure 9:
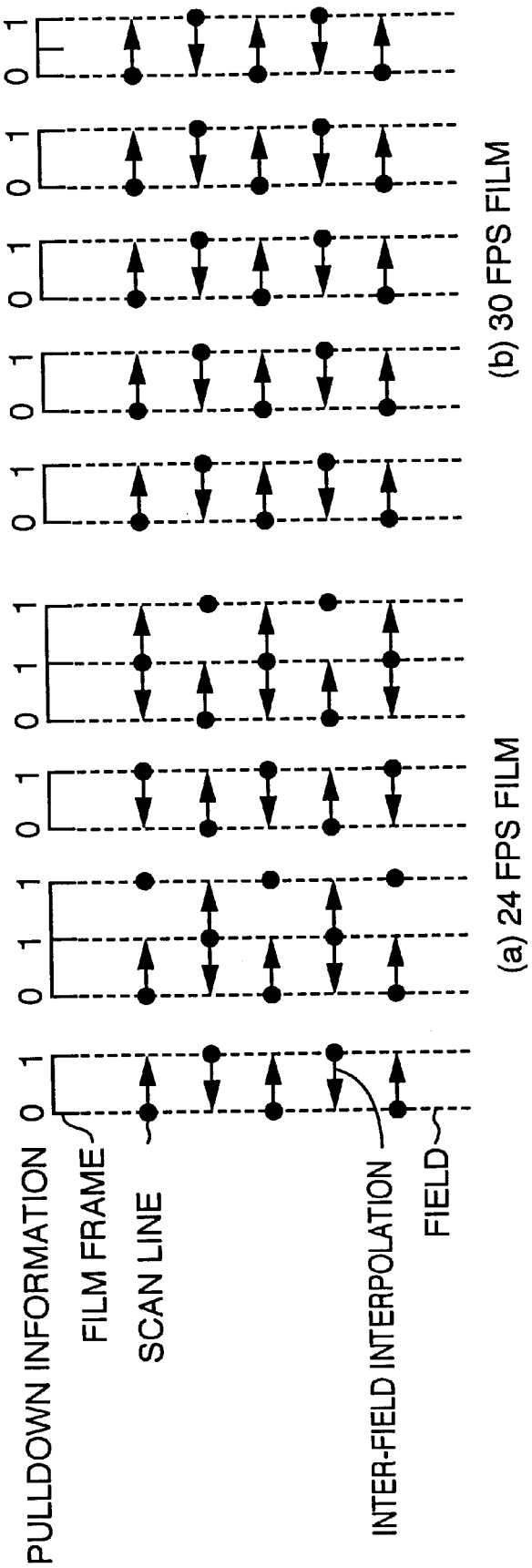
FIG. 9 is a schematic diagram for explaining a scan line interpolating process for a conventional telecine video signal.

On the other hand, the control signal contains the information of both the determination signal and the field information as shown in FIG. 8. When the control signal is 1, 2, or 3, the determination signal is a 3-2 pulldown signal and the field information is the preceding field information. When the control signal is 0, it represents a conventional interlace scanning signal. In this case, the control signal has four values from 0 to 3 (represented with two bits). When the control signal is 0, the selection circuit 107 selects the output signal of the progressive scanning signal converting circuit 105. When the control signal is not 0, the selection circuit 107 selects the output signal of the progressive scanning signal converting circuit 114. When the control signal is 1, the progressive scanning signal converting circuit 114 performs an inter-field process with the future field and outputs the resultant progressive scanning signal. When the control signal is 2 or 3, the progressive scanning signal converting circuit 114 performs an inter-field process with the past field and outputs the resultant progressive scanning signal.

In this embodiment, even if both a signal converted into an interlace scanning signal with the 3-2 pulldown format and a conventional interlace scanning signal are present, a progressive scanning signal converting process corresponding to an input signal can be performed. When a signal converted into an interlace scanning signal with the 3-2 pulldown format is input, with the field information that represents which field is generated with the same frame, the progressive scanning signal converting process corresponding to the process of the 3-2 pulldown format can be performed. When a conventional interlace scanning signal is input, the progressive scanning signal converting process corresponding to the motion adaptive process can be performed. Thus, the relevant progressive scanning signal converting process can be performed corresponding to the type of the input signal.

In the embodiment, the value of the control signal is in the range from 0 to 3. However, according to the present invention, the value of the control signal is not limited in such a range as long as the control signal contains the information of both the determination signal and the field information. In the embodiment, the control signal containing the information of both the determination signal and the field information is generated. However, when the field information received from the field information generating circuit is supplied to the progressive scanning signal converting circuit 114 and the determination signal that is received from the determining circuit 103 is supplied to the selection circuit 107, it is not necessary to generate the control signal.

Figure 3:
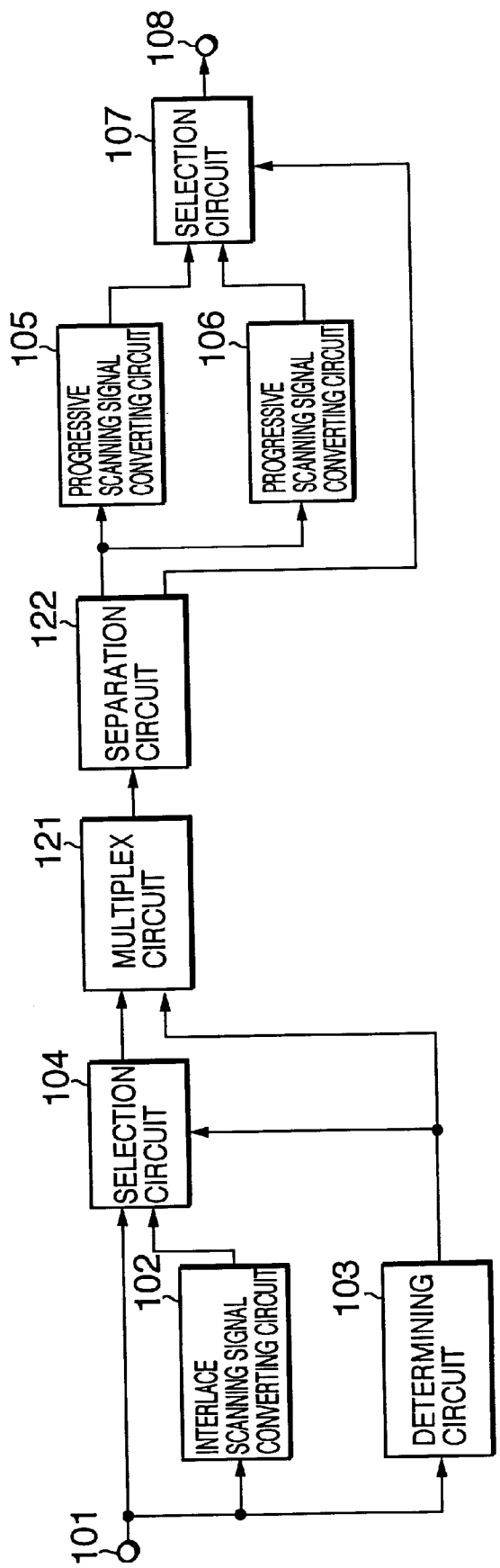
FIG. 3 is a block diagram showing the structure of a video signal processing apparatus according to a third embodiment of the present invention.

FIG. 3 is a block diagram showing the structure of a video signal processing apparatus according to a third embodiment of the present invention. For simplicity, in FIG. 3, similar portions to those in FIG. 1 are denoted by similar reference numerals. In the following, different structural portions will be described.

In FIG. 3, a video signal received from a selection circuit 104 and a determination signal received from a determining circuit 103 are supplied to a multiplex circuit 121. The multiplex circuit 121 multiplexes the video signal with the determination signal received from the determining circuit 103 in a non-effective video period of the video signal received from the selection circuit 104. The non-effective video period is for example a vertical blanking period or a horizontal blanking period. An output signal of the multiplex circuit 121 is supplied to a separation circuit 122.

The separation circuit 122 separates the video signal that is multiplexed and received from the selection circuit 104 from the determination signal that is received from the determining circuit 103. The video signal that is separated by the separation circuit 122 and received from the selection circuit 104 is supplied to a progressive scanning signal converting circuit 105 and a progressive scanning signal converting circuit 106. In addition, the determination signal that is separated by the separation circuit 122 and received from the determining circuit 103 is supplied as a control signal to a selection circuit 107.

According to the embodiment, even if both a signal converted into an interlace scanning signal with the 3-2 pulldown format and a conventional interlace scanning signal are present, the interlace scanning signal with the 3-2 pulldown format can be converted into a progressive scanning signal corresponding to the process of the 3-2 pulldown format. In addition, the conventional interlace scanning signal can be converted into a progressive scanning signal corresponding to the motion adaptive process. Thus, the relevant progressive scanning signal converting process can be performed corresponding to the type of the input signal. In addition, since the control signal is multiplexed in a non-effective video period, it is not necessary to separately transmit a control signal.

Figure 4:
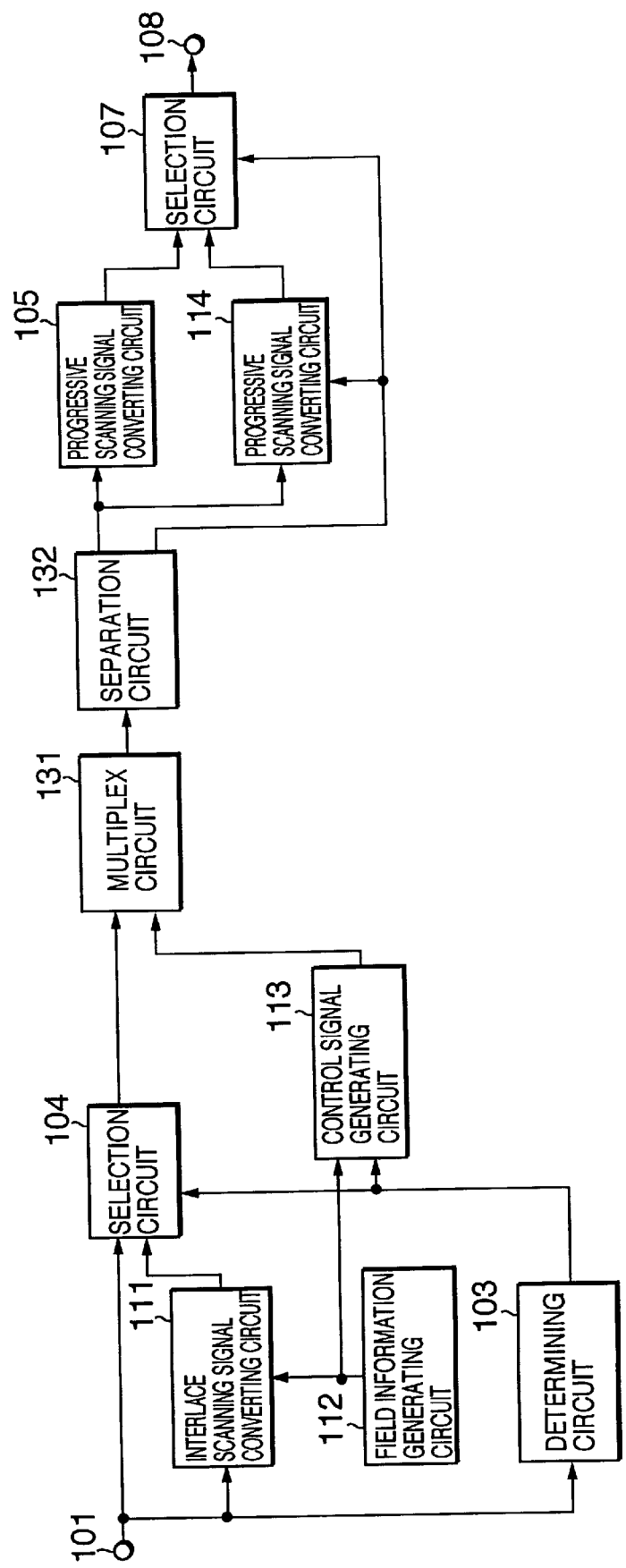
FIG. 4 is a block diagram showing the structure of a video signal processing apparatus according to a fourth embodiment of the present invention.

FIG. 4 is a block diagram showing the structure of a video signal processing apparatus according to a fourth embodiment of the present invention. For simplicity, in FIG. 4, similar portions to those in FIG. 2 are denoted by similar reference numerals. Only different structural portions will be described.

In FIG. 4, a video signal received from a selection circuit 104 and a control signal received from a control signal generating circuit 113 are supplied to a multiplex circuit 131. The multiplex circuit 131 multiplexes the video signal with the control signal received from the control signal generating circuit 113 in a non-effective video period of the video signal received from the selection circuit 104. The non-effective video period is for example a vertical blanking period or a horizontal blanking period. An output signal of the multiplex circuit 131 is supplied to a separation circuit 132.

The separation circuit 132 separates the video signal that is multiplexed and received from the selection circuit 104 from the determination signal that is received from the control signal generating circuit 113. The video signal that is separated by the separation circuit 122 and received from the selection circuit 104 is supplied to a progressive scanning signal converting circuit 105 and a progressive scanning signal converting circuit 114. The determination signal that is separated by the separation circuit 122 and received from the control signal generating circuit 113 is supplied as a control signal to the progressive scanning signal converting circuit 114 and a selection circuit 107.

According to the embodiment, even if both a signal converted into an interlace scanning signal with the 3-2 pulldown format and a conventional interlace scanning signal are present, the relevant progressive scanning signal converting process can be performed corresponding to the type of the input signal. When an interlace scanning signal with the 3-2 pulldown format is input, with information that represents which field is generated with the same frame, the progressive scanning signal converting process corresponding to the process of the 3-2 pulldown format can be performed. In contrast, when a conventional interlace scanning signal is input, the progressive scanning signal converting process corresponding to the motion adaptive process can be performed. In addition, since the control signal for switching the process and the field information necessary for the process of the 3-2 pulldown format are multiplexed in a non-effective video period, it is not necessary to separately transmit additional information. Thus, the relevant progressive scanning signal converting process can be performed corresponding to the type of the input signal.

Figure 5:
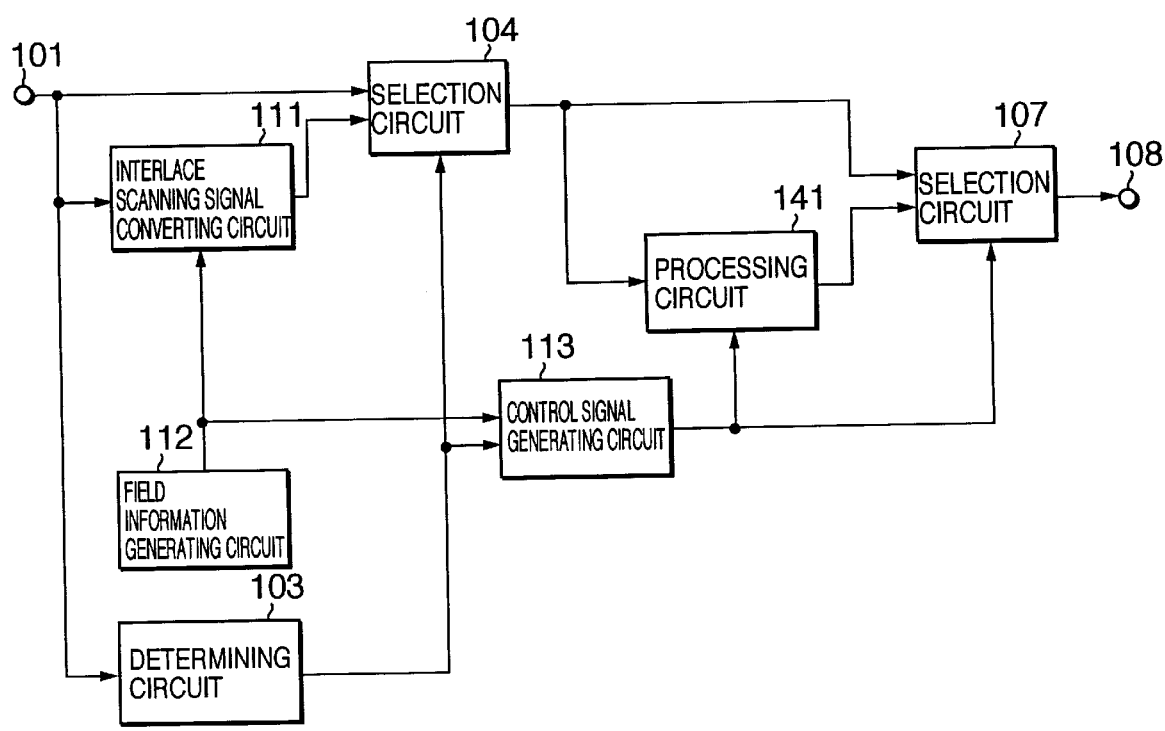
FIG. 5 is a block diagram showing the structure of a video signal processing apparatus according to a fifth embodiment of the present invention.

FIG. 5 is a block diagram showing the structure of a video signal processing apparatus according to a fifth embodiment of the present invention. For simplicity, in FIG. 5, similar portions to those in FIG. 2 are denoted by similar reference numerals.

In FIG. 5, a video signal that is output from a selection circuit 104 is supplied to a selection circuit 107 and a processing circuit 141. Field information contained in a control signal that is received from a control signal generating circuit 113 is supplied to a processing circuit 141. The processing circuit 141 processes a video signal that is received from the selection circuit 104 with the field information.

The selection circuit 107 selects one of two input signals with the information of a determination signal contained in the control signal supplied from the control signal generating circuit 113. When the information of the determination signal contained in the control signal that is received from the control signal generating circuit 113 represents a 24 fps progressive scanning video signal, the selection circuit 107 selects the output signal of the processing circuit 141 and outputs the selected signal to an output terminal 108. When the information of the determination signal contained in the control signal that is received from the control signal generating circuit 113 represents a conventional NTSC format interlace scanning video signal, the selection circuit 107 selects the output signal of the selection circuit 104 and outputs the selected signal to the output terminal 108.

According to the embodiment, even if both a signal converted into an interlace scanning signal with the 3-2 pulldown format and a conventional interlace scanning signal are present, only the interlace scanning signal with the 3-2 pulldown format can be processed corresponding to the process of the 3-2 pulldown format. Thus, the relevant interlace scanning signal converting process can be performed corresponding to the type of the input signal.

Figure 6:
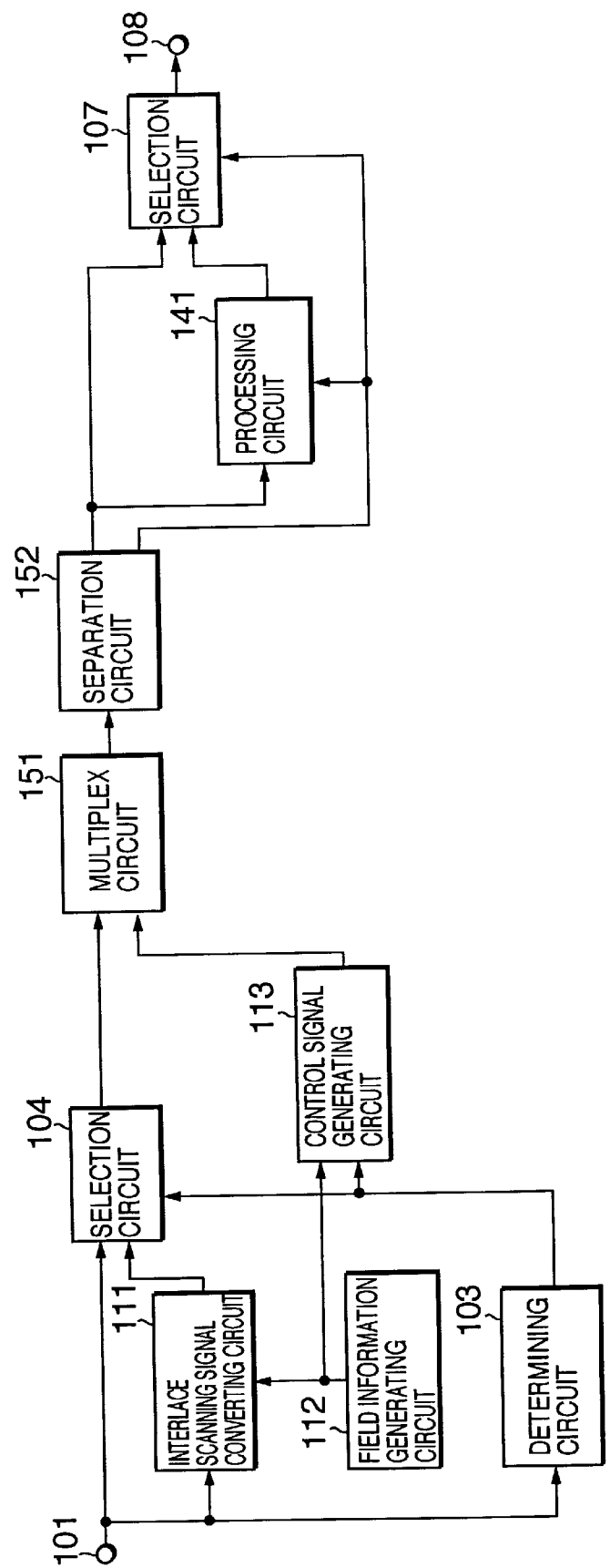
FIG. 6 is a block diagram showing the structure of a video signal processing apparatus according to a sixth embodiment of the present invention.

FIG. 6 is a block diagram showing the structure of a video signal processing apparatus according to a sixth embodiment of the present invention. For simplicity, in FIG. 6, similar portions to those in FIG. 5 are denoted by similar reference numerals and their description will be omitted.

A video signal that is output from a selection circuit 104 and a control signal that is output from a control signal generating circuit 113 are supplied to a multiplex circuit 151. The multiplex circuit 151 multiplexes the video signal with the control signal received from the control signal generating circuit 113 in a non-effective video period of the video signal received from the selection circuit 104. The non-effective video period is for example a vertical blanking period or a horizontal blanking period. An output signal of the multiplex circuit 151 is supplied to a separation circuit 152.

The separation circuit 152 separates the video signal that is multiplexed and received from the selection circuit 104 from the control signal that is received from the control signal generating circuit 113. The video signal that is separated by the separation circuit 122 and received from the selection circuit 104 is supplied to a selection circuit 107 and a processing circuit 141. The control signal that is separated by the separation circuit 152 and received from the control signal generating circuit 113 is supplied as a control signal to the processing circuit 141 and the selection circuit 107.

According to the embodiment, even if both a signal converted into an interlace scanning signal with the 3-2 pulldown format and a conventional interlace scanning signal are present, only the interlace scanning signal with the 3-2 pulldown format can be processed corresponding to the process of the 3-2 pulldown format with the field information that represents which field is generated with the same frame. Thus, the relevant process can be performed corresponding to the type of the input signal.

The present invention is not limited to the above-described embodiments. A movie was described as a 24 fps progressive scanning signal. Alternatively, a movie may be a 30 fps progressive scanning signal. In addition, the interlace scanning video signal was described as an NTSC format signal (namely, 60 Hz video signal). However, the present invention can be applied to a PAL format (namely, 50 Hz video signal).

As described above, in the video signal processing apparatus according to the present invention, even if both a progressive scanning signal and an interlace scanning signal are present, progressive scanning video signals corresponding to these input signal can be obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A video signal processing apparatus, comprising:
   means for determining whether an input signal is a progressive scanning first video signal or an interlace scanning second video signal and generating a determination signal corresponding to the determined result;
   first converting means for converting said first video signal into an interlace scanning third video signal when said first video signal has been input;
   means for outputting a fourth video signal, said fourth video signal corresponding to said second video signal when said determination signal represents that said second video signal has been input and corresponding to said third video signal when said determination signal represents that said first video signal has been input;
   second converting means for converting said fourth video signal into a progressive scanning signal corresponding to motion information of said fourth video signal when said fourth video signal corresponds to said second video signal;
   third converting means for converting said fourth video signal into a progressive scanning signal corresponding to said first converting means when said fourth video signal corresponds to said third video signal; and
   means for selecting an output signal of said second converting means and outputting a fifth video signal when said determination signal represents that said second video signal has been input and for selecting an output signal of said third converting means and outputting a fifth video signal when said determination signal represents that said first video signal has been input.

2. A video signal processing apparatus, comprising:
   means for determining whether an input signal is a progressive scanning first video signal or an interlace scanning second video signal and generating a determination signal corresponding to the determined result;
   first converting means for converting said first video signal into an interlace scanning third video signal when said first video signal has been input;
   means for generating a field determination signal that represents that the next field of said third video signal are generated with the same frame as said first video signal;
   means for outputting a fourth video signal, said fourth video signal corresponding to said second video signal when said determination signal represents that said second video signal has been input and corresponding to said third video signal when said determination signal represents that said first video signal has been input;
   means for generating a control signal with said determination signal and said field determination signal, the control signal containing the information of both said determination signal and said field determination signal;
   second converting means for converting said fourth video signal into a progressive scanning signal corresponding to motion information of said fourth video signal when said fourth video signal corresponds to said second video signal;
   third converting means for converting said fourth video signal into a progressive scanning signal corresponding to said first converting means with said field determination signal contained in said control signal when said fourth video signal corresponds to said third video signal; and
   means for selecting an output signal of said second converting means and outputting a fifth video signal when said determination signal contained in said control signal represents that said second video signal has been input and for selecting an output signal of said third converting means and outputting a fifth video signal when said determination signal contained in said control signal represents that the said first video signal has been input.

3. A video signal processing apparatus, comprising:
   means for determining whether an input signal is a progressive scanning first video signal or an interlace scanning second video signal and generating a determination signal corresponding to the determined result;

first converting means for converting said first video signal into an interlace scanning third video signal when said first video signal has been input;

means for generating a field determination signal that represents that the next field of said third video signal are generated with the same frame as said first video signal;

means for outputting a fourth video signal, said fourth video signal corresponding to said second video signal when said determination signal represents that said second video signal has been input and corresponding to said third video signal when said determination signal represents that said first video signal has been input;

means for generating a control signal containing the information of both said determination signal and said field determination signal; and means for processing the fourth video signal with said field determination signal contained in said control signal when said determination signal contained in said control signal represents that said first video signal has been input.

4. The video signal processing apparatus as set forth in claim 2 or 3, wherein said field determination signal represents which field generated with the same frame of said first video signal.

5. The video signal processing apparatus as set forth in claim 1, wherein said determination signal is multiplexed with said fourth video signal in a non-effective video period thereof.

6. The video signal processing apparatus as set forth in claim 2, or 3, wherein said control signal is multiplexed with said fourth video signal in a non-effective video period thereof.

7. The video signal processing apparatus as set forth in claim 1, 2, or 3, wherein said first video signal is a telecine signal, and wherein said second video signal is an NTSC format television signal.

\* \* \* \* \*